United States Patent
Murakawa et al.

(10) Patent No.: US 8,594,673 B2
(45) Date of Patent: Nov. 26, 2013

(54) BANDWIDTH CONTROL SYSTEM

(75) Inventors: Taichi Murakawa, Fujisawa (JP); Tsuyoshi Tamaki, Machida (JP)

(73) Assignee: Hitachi, Ltd., Tokyo (JP)

( * ) Notice: Subject to any disclaimer, the term of this patent is extended or adjusted under 35 U.S.C. 154(b) by 98 days.

(21) Appl. No.: 13/397,979

(22) Filed: Feb. 16, 2012

(65) Prior Publication Data

US 2012/0214491 A1 Aug. 23, 2012

(30) Foreign Application Priority Data

Feb. 22, 2011 (JP) ................... 2011-036245

(51) Int. Cl.
*H04W 36/00* (2009.01)
(52) U.S. Cl.
USPC ........... 455/436; 370/468; 370/232; 370/331; 455/453; 455/445; 455/451; 455/452.2
(58) Field of Classification Search
USPC ............ 455/436, 453, 445, 451, 452.2; 370/468, 232, 331
See application file for complete search history.

(56) References Cited

U.S. PATENT DOCUMENTS

| 7,116,682 | B1 * | 10/2006 | Waclawsky et al. | 370/468 |
| 7,965,633 | B2 * | 6/2011 | Bosch et al. | 370/232 |
| 2010/0054208 | A1 * | 3/2010 | Kojima | 370/331 |
| 2012/0022968 | A1 * | 1/2012 | Manku | 705/26.41 |

OTHER PUBLICATIONS

Handovers with Optimizations Between E-UTRAN Access and CDMA2000 Access; 3GPP TS 23.402 V8.7.0, Release 8; Sep. 2009; pp. 153-169.

* cited by examiner

*Primary Examiner* — David Q Nguyen
(74) *Attorney, Agent, or Firm* — Foley & Lardner LLP (57) ABSTRACT

A bandwidth control system is provided, enabling the prevention of a resource shortage in the base station, caused by preliminary authentication which reserves resources in advance. The bandwidth control system limits a bandwidth of a communication path used for the preliminary authentication, in the case where a count of successful authentication of the wireless terminal belonging to the first wireless system and a count of successful preliminary authentication transmitted from the wireless terminal belonging to the second wireless system establish a predetermined relationship.

6 Claims, 8 Drawing Sheets

PRELIMINARY AUTHENTICATION INFORMATION HOLDER 235

| TERMINAL ID (2350) | REGISTRATION DATE AND TIME (2351) |
|---|---|
| M001 | 2011/02/08 10:01:30 |
| M002 | 2011/02/08 10:20:46 |
| ⋮ | ⋮ |

PRELIMINARY AUTHENTICATION INFORMATION HOLDER 235

| TERMINAL ID (2350) | REGISTRATION DATE AND TIME (2351) |
|---|---|
| M001 | 2011/02/08 10:01:30 |
| M002 | 2011/02/08 10:20:46 |
| ⋮ | ⋮ |

BAND LIMITING REQUEST HOLDER 403

| BASE STATION ID (404) | LIMITING REQUEST FLAG (405) |
|---|---|
| B001 | 0 |
| B002 | 1 |
| ⋮ | ⋮ |

BANDWIDTH CONTROL SYSTEM

CROSS REFERENCE TO RELATED APPLICATIONS

This application claims priority to Japanese Patent Application No. 2011-036245 filed on Feb. 22, 2011, the entire contents of which are incorporated by reference herein.

BACKGROUND OF THE INVENTION

1. Field of the Invention

The present invention relates to a technique for controlling a communication band between different wireless systems.

2. Description of the Related Art

In the case where a current wireless communication system such as EvDO (1× Evolved Data Only Rev. A), for instance, migrates to a next-generation wireless communication system such as LTE/SAE (Long Term Evolution/System Architecture), for instance, there is a phase where the current wireless communication system and the next-generation wireless communication system coexist in the migration period until the next-generation wireless communication system successfully covers sufficient areas.

During this phase, when a wireless terminal moves into an area where a service according to the next-generation wireless communication system is not provided, a handover is performed from the next-generation wireless communication system, down to the current wireless communication system, thereby enabling a continuous provision of communication service. On this occasion, the wireless terminal is required to execute a new authentication process with the current wireless communication system. If it takes time for this authentication process, causing a temporary interruption in communication, and this may deteriorate a quality of the service.

In order to avoid the situation above, for instance, the document "3GPP TS 23.402 V 8.7.0 (2009-09) "9 Handovers with Optimizations Between E-UTRAN Access and CDMA2000 Access"" (hereinafter, referred to as "Non Patent Document 1") discloses a technique that the authentication process is preliminarily completed with the system being a target of the handover (hand-down), before the handover is carried out, thereby reducing the time required for the handover. If the preliminary authentication is successful, a base station being a destination of the handover reserves resources within its own station, for the wireless terminal that has been subjected to the preliminary authentication.

SUMMARY OF THE INVENTION

In the meantime, the preliminary authentication is effective from a viewpoint of speeding up the handover, however, even though the preliminary authentication has been performed, the handover procedure is not necessarily executed, depending on subsequent radio wave conditions. This means that the base station being the handover destination is forced to reserve resources for the wireless terminal as to which it is uncertain whether the handover is executed or not.

The resources prepared for the handover may be resulted in being reserved uselessly, if the handover is not actually executed, and even when the resources are required by a second wireless terminal as a practical manner, the base station is not allowed to assign the resources reserved for the handover, to the second wireless terminal, and the base station may end up with running short of the resources.

The present application has been made considering the situation above, and an object of the present application is to prevent a shortage of resources in the base station, due to the preliminary authentication which reserves the resources in advance.

In order to solve the problem above, a configuration as described in the appended claims is employed, for instance.

More than one means are suggested by the present application for solving the problem above, and one example thereof is directed to a bandwidth control system, including a base station provided in a first wireless system, a relay device for relaying a preliminary authentication request transmitted from a second wireless system to the base station, and a bandwidth control device for controlling a bandwidth of a communication path for relaying the preliminary request from the second wireless system to the base station, wherein; the base station includes a local authentication information holder for storing identification information of a wireless terminal being successful in authentication, among the wireless terminals authenticated by the base station through wireless communication, a preliminary authentication information holder for storing identification information of the wireless terminal being successful in preliminary authentication, based on the preliminary authentication request received via the relay device, and a band limiting indicator for transmitting to the bandwidth control device, a band limiting instruction to limit a bandwidth of the communication path for relaying the preliminary authentication request from the second wireless system to the base station, in the case where a predetermined relationship is established between a local authentication count corresponding to a count of the identification information of the wireless terminal held by the local authentication information holder, and a preliminary authentication count corresponding to a count of the identification information of the wireless terminal held by the preliminary authentication information holder; the bandwidth control device instructs the relay device to limit the bandwidth of the communication path for relaying the preliminary authentication request from the second wireless system to the base station, upon receipt of the band limiting instruction from the base station; and the relay device limits the bandwidth of the communication path, upon receipt of the instruction from the bandwidth control device, to limit the bandwidth of the communication path for relaying the preliminary authentication request from the second wireless system to the base station.

According to the present application, it is possible to prevent a shortage of resources in the base station, due to the reservation of the resources by the preliminary authentication.

Subjects, structures, and effects other than those described above are obvious from the explanation of the embodiment set forth below.

DESCRIPTION OF THE PREFERRED EMBODIMENT

Hereinafter, a preferred embodiment of the present invention will be explained, with reference to the accompanying drawings.

Figure 1:
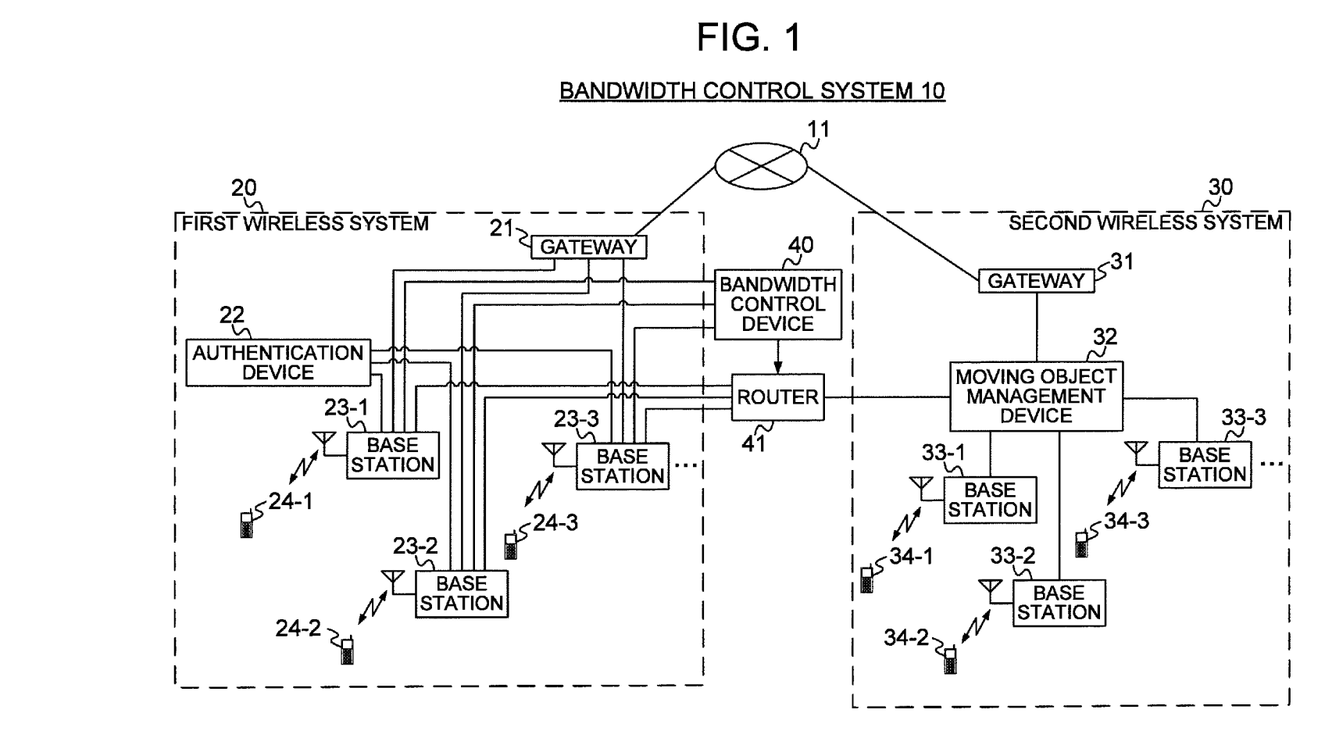
FIG. 1 is a system block diagram showing an example of the bandwidth control system relating to one embodiment of the present invention.

FIG. 1 is a system block diagram showing one example of the configuration of the bandwidth control system 10 relating to one embodiment of the present invention. The bandwidth control system 10 is provided with multiple base stations 23 incorporated in the first wireless system 20, a router 41 for relaying a preliminary authentication request transmitted from the second wireless system 30 to the base stations 23, and a bandwidth control device 40 for controlling a bandwidth of a communication path for relaying the preliminary authentication request from the second wireless system 30 to each of the base stations 23.

In the example shown in FIG. 1, the first wireless system 20, for example, corresponds to a currently used wireless communication system such as EvDO (1×Evolved Data Only Rev. A), and the second wireless system 30, for example, corresponds to a next-generation wireless communication system such as LTE/SAE (Long Term Evolution/System Architecture).

The second wireless system 30 has a gateway 31, a moving object management device 32, multiple base stations 33, and wireless terminals 34. The wireless terminal 34 establishes audio communications and data communications with another wireless terminal 34 via the base station 33. The wireless terminal 34 further establishes audio communications and data communications with other equipment connected to a wide area network 11, via the base stations 33, the moving object management device 32, and gateway 31.

Upon receipt of a preliminary authentication request from the wireless terminal 34, the request including a terminal ID for identifying the wireless terminal 34 and a base station ID for identifying the base station 23 being a handover destination, and the like, each of the base stations 33 transmits the preliminary authentication request to the moving object management device 32. The moving object management device 32 transfers the preliminary authentication request transmitted from the base station 33 to the router 41. The router 41 relays the preliminary authentication request transferred from the moving object management device 32 to the base station 23 being a target of the preliminary authentication request.

The first wireless system 20 has a gateway 21, an authentication device 22, multiple base stations 23, and wireless terminals 24. The wireless terminal 24 establishes audio communications and data communications with another wireless terminal 24 via the base station 23. The wireless terminal 24 further establishes audio communications and data communications with other equipment connected to the wide area network 11, via the base station 23 and the gateway 21.

Upon being requested to register a position, from the wireless terminal 24 by means of the wireless communication, each of the base stations 23 uses the authentication device 22 to authenticate the wireless terminal 24. Then, if the authentication is successful, the base station 23 reserves resources for the wireless terminal 24, the resources being required for call processing, and provides a communication service to the wireless terminal 24 with the use of the resources.

In receipt of the preliminary authentication request from the second wireless system 30 via the router 41, the base station 23 uses the authentication device 22 to authenticate the wireless terminal 34 being a source of transmitting the preliminary authentication request. Then, if the authentication is successful, the base station 23 reserves resources for the wireless terminal 34, the resources being required for call processing, and in the case where the wireless terminal 34 executes the handover (hand-down) to establish communication via the base station 23, the base station 23 provides the communication service to the wireless terminal 34 by the use of the resources being reserved.

In addition, each of the base stations 23 uses information, including a maximum number of wireless terminals being accommodated, the number of wireless terminals 24 as to which the resources are reserved, and the number of the wireless terminals 34 as to which the resources are reserved, and determines whether or not a bandwidth of the communication path is to be limited through which the second wireless system 30 transfers the preliminary authentication request. If it is determined that the bandwidth of the communication path is to be limited, each of the base stations 23 transmits to the bandwidth control device 40, a band limiting request indicating that the bandwidth is to be limited. A specific method will be discussed later, how to determine whether or not the bandwidth of the communication path is to be controlled.

On the basis of the band limiting request received from each of the base stations 23, the bandwidth control device 40 determines whether or not a communication band of the router 41 is to be limited, the router 41 relaying the preliminary authentication request transmitted from the second wireless system 30 to the base station 23. If it is determined that the communication band of the router 41 is limited, the bandwidth control device 40 transmits a band limiting instruction to the router 41. The router 41 that has received the band limiting instruction limits the bandwidth of the communication path used for relaying the preliminary authentication request transmitted from the second wireless system 30 to the base station 23.

Figure 2:
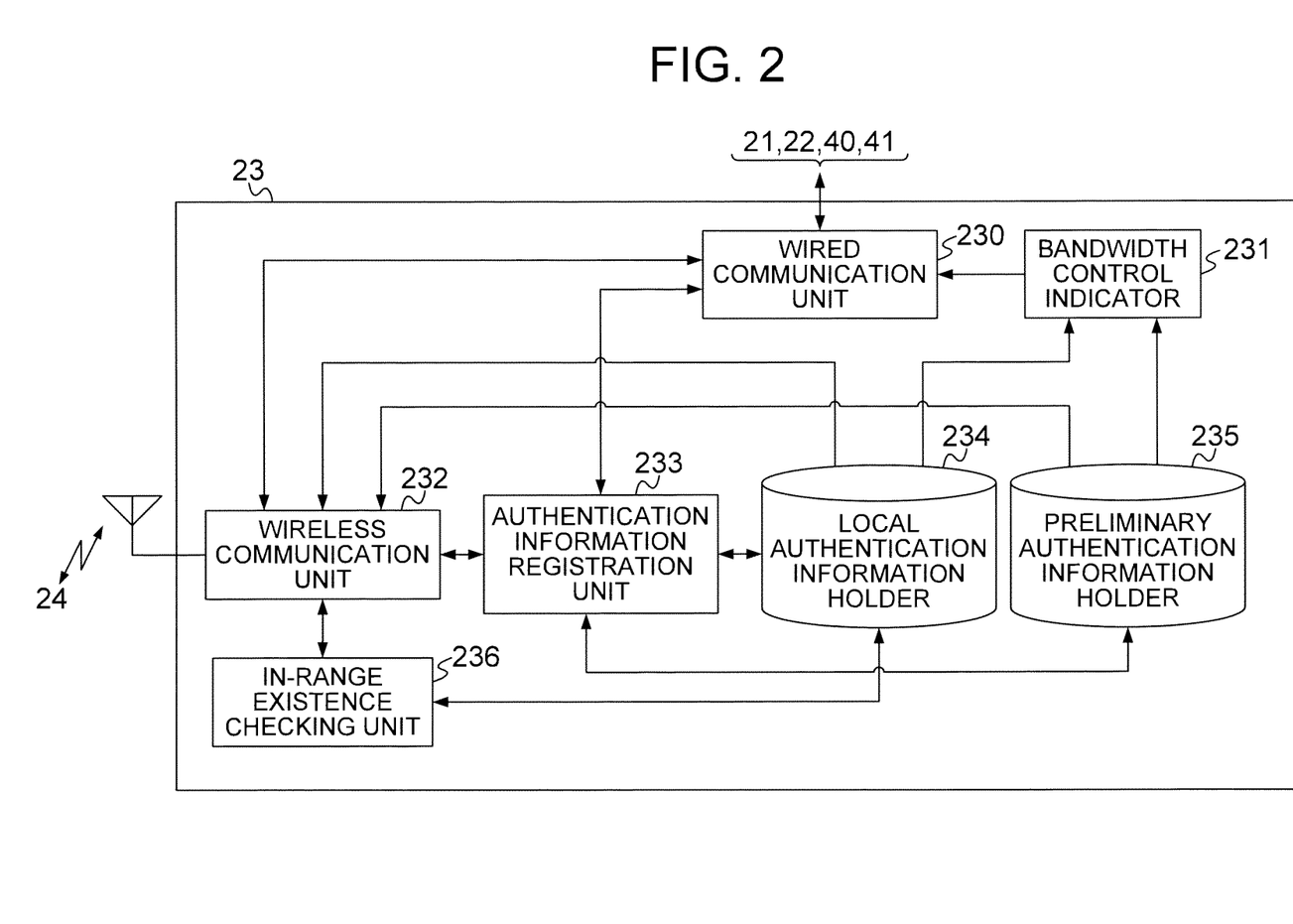
FIG. 2 is a block diagram showing one example of a functional configuration of the base station.

FIG. 2 is a block diagram showing one example of the functional configuration of the base station 23. The base station 23 includes a wired communication unit 230, a bandwidth control indicator 231, a wireless communication unit 232, an authentication information registration unit 233, a local authentication information holder 234, a preliminary authentication information holder 235, and an in-range existence checking unit 236.

Figure 3:
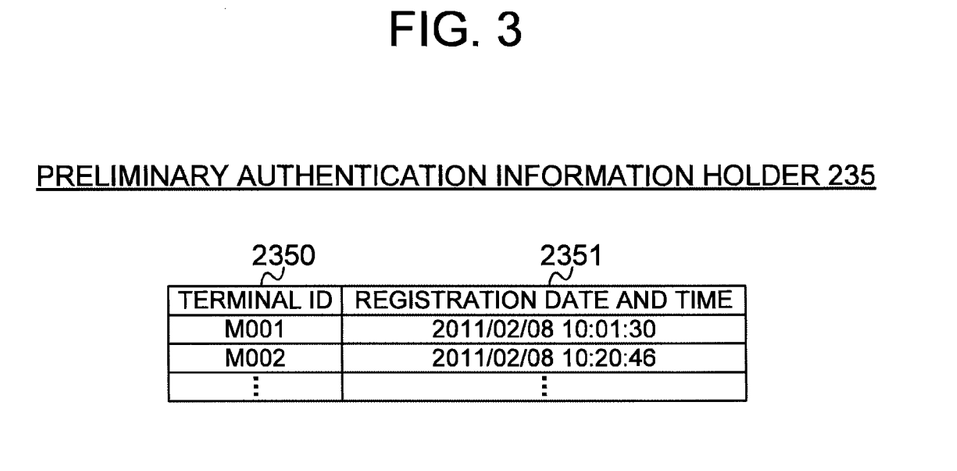
FIG. 3 illustrates one example of data structure held by the preliminary authentication information holder.

The wired communication unit 230 transmits and receives data via the wired communication, to and from the gateway 21, the authentication device 22, the bandwidth control device 40, and the router 41. The local authentication information holder 234 holds a terminal ID of the wireless terminal 24 being successful in authentication according to the communication with the base station 23 by means of the wireless communication. As shown in FIG. 3, for instance, the preliminary authentication information holder 235 stores a registered date and time 2351 when a terminal ID 2350 is registered, in association with the terminal ID 2350 of the wireless terminal 34 being successful in the preliminary authentication.

The wireless communication unit 232 transmits and receives data to and from the wireless terminal 24 by means of the wireless communication. In addition, the wireless communication unit 232 holds in advance the information as to the maximum number of wireless terminals being able to be accommodated by the base station 23, based on a call processing capacity, and the like, of the base station 23.

In addition, upon receipt of a request to register a position from the wireless terminal 24 by means of the wireless communication, the wireless communication unit 232 rejects the request for registering the position, if a total of the number of the terminal ID held by the local authentication information holder 234 and the number of the terminal ID held by the preliminary authentication information holder 235 reaches the maximum number of the wireless terminals being able to be accommodated. On the other hand, if the total is less than the maximum number of the wireless terminals being able to be accommodated, the wireless communication unit 232 transfers the request for registering the position to the authentication information registration unit 233.

Upon receipt of the request for registering the position from the wireless communication unit 232, the authentication information registration unit 233 determines whether or not the terminal ID of the wireless terminal 24 being the source of transmitting the request for registering the position is already registered in the preliminary authentication information holder 235.

If the terminal ID of the wireless terminal 24 being the source of transmitting the request for registering the position is already registered in the preliminary authentication information holder 235, in other words, if the wireless terminal 24 is the terminal that comes in, according to the handover after the preliminary authentication, the authentication information registration unit 233 registers the information of the wireless terminal 24 in a device for managing the positional information of the wireless terminal 24, via the wired communication unit 230.

Then, the authentication information registration unit 233 registers the terminal ID of the wireless terminal 24 in the local authentication information holder 234, and deletes from the preliminary authentication information holder 235, the terminal ID and the registered date and time of the wireless terminal 24. In addition, the authentication information registration unit 233 notifies the wireless terminal 24 that the position registration is completed, via the wireless communication unit 232.

On the other hand, if the terminal ID of the wireless terminal 24 being the source of transmitting the position registration request is not registered in the preliminary authentication information holder 235, the authentication information registration unit 233 transfers the information of the wireless terminal 24 being the source of transmitting the position registration request, to the authentication device 22 via the wired communication unit 230, and allows the authentication device 22 to authenticate the wireless terminal 24. If the authentication fails, the authentication information registration unit 233 notifies the wireless terminal 24 of the failure in registering the position, via the wireless communication unit 232.

On the other hand, if the authentication is successful, the authentication information registration unit 233 registers the information of the wireless terminal 24, via the wired communication unit 230, in a device for managing the positional information of the wireless terminal 24. Then, the authentication information registration unit 233 registers the terminal ID of the wireless terminal 24 in the local authentication information holder 234, and notifies the wireless terminal 24, via the wireless communication unit 232, that the position registration is completed.

In addition, upon receipt of a preliminary authentication request from the router 41 via the wired communication unit 230, the authentication information registration unit 233 returns an instruction to reject the preliminary authentication request, in the case where a total of the number of the terminal ID held by the local authentication information holder 234, and the number of the terminal ID held by the preliminary authentication information holder 235 reaches the maximum number of wireless terminals being able to be accommodated.

On the other hand, if the total is less than the maximum number of wireless terminals being able to be accommodated, the wireless communication unit 232 transfers information of the wireless terminal 34 being the source of transmitting the preliminary authentication request, to the authentication device 22, via the wired communication unit 230, and allows the authentication device 22 to authenticate the wireless terminal 34. If the authentication fails, the authentication information register 233 notifies the wireless terminal 34 of the failure in the preliminary authentication, via the wired communication unit 230.

On the other hand, if the preliminary authentication is successful, the authentication information registration unit 233 registers the terminal ID and the registration date and time of the wireless terminal 34 in the preliminary authentication information holder 235, and notifies the wireless terminal 34 that the preliminary authentication is completed, via the wired communication unit 230. In addition, the authentication information registration unit 233 monitors the registration date and time in the preliminary authentication information holder 235, and deletes the terminal ID as to which a predetermined period of time has elapsed since the registration (e.g., 30 minutes), together with the registration date and time, from the preliminary authentication information holder 235.

The in-range existence checking unit 236 refers to the local authentication information holder 234, and transmits an in-range existence checking request at a predetermined timing (e.g., every 10 minutes) via the wireless communication unit 232, to the wireless terminal 24 associated with the terminal ID held by the local authentication information holder 234. If there is any wireless terminal 24 which does not respond to the in-range existence checking request, the in-range existence checking unit 236 deletes the terminal ID of the wireless terminal 24 from the local authentication information holder 234.

The bandwidth control indicator 231 holds in advance the maximum number of wireless terminals being able to be accommodated in the base station 23, refers to the terminal ID in the local authentication information holder 234 and the terminal ID in the preliminary authentication information holder 235, at a predetermined timing (e.g., every 10 minutes), and determines whether or not the bandwidth of the communication path is to be limited, through which the second wireless system 30 transfers the preliminary authentication request. When it is determined that the bandwidth is to be limited, the bandwidth control indicator 231 transmits a band limiting request including the base station ID for identifying the base station 23, to the bandwidth control device 40 via the wired communication unit 230. Hereinafter, an example of the method how to make the determination will be discussed.

The bandwidth control indicator 231 calculates the number of the terminal ID in the local authentication information holder 234, as the count of local authentication $A(tn)$, and calculates the number of the terminal ID in the preliminary authentication information holder 235 as the count of preliminary authentication $B(tn)$. In the case where the total $C(tn)$ of the count of local authentication $A(tn)$ and the count of preliminary authentication B(tn) is equal to or larger than the threshold 1, that is, the total is included in the cross-hatched range 50 as shown in FIG. 4, the bandwidth control indicator 231 determines that the bandwidth of the communication path through which the second wireless system 30 transfers the preliminary authentication request is to be limited.

Figure 4:
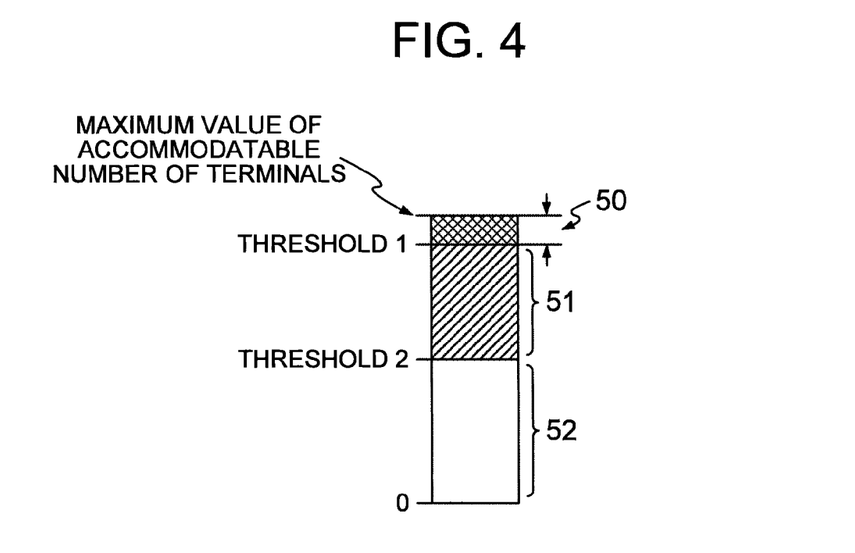
FIG. 4 is a conceptual diagram for explaining one example of a method for determining a band limitation.

On the other hand, in the case where the total C(tn) is equal to or larger than the threshold 2 and smaller than the threshold 1, that is, in the case where the total is included in the shaded range 51 as shown in FIG. 4, the bandwidth control indicator 231 divides the count of preliminary authentication B(tn) by the total C(tn), thereby calculating the a ratio of preliminary authentication R(tn). In the case where the ratio of preliminary authentication R(tn) is equal to or higher than the threshold 3, the bandwidth control indicator 231 determines that the bandwidth of the communication path through which the wireless system 30 transmits the preliminary authentication request is to be limited.

When the ratio of preliminary authentication R(tn) is lower than the threshold 3, or the total C(tn) is smaller than the threshold 2, the bandwidth control indicator 231 determines not to limit the bandwidth of the communication path through which the second wireless system 30 transfers the preliminary authentication request. It is to be noted that in the present embodiment, the maximum value of the number of terminals being able to be accommodated is 20, for instance, the threshold 1 is 18, for instance, the threshold 2 is 10, for instance, and the threshold 3 is ¼, for instance.

As thus described, if the total C(tn) of the count of local authentication A(tn) and the count of preliminary authentication B(tn) is the number close to the maximum value of the number of terminals being able to be accommodated, the bandwidth of the communication path through which the second wireless system 30 transfers the preliminary authentication request is limited, thereby retaining within the base station 23 the resources reservable for the wireless terminal 24 under control, and enabling a reservation of the resources for the wireless terminal 24 which newly requests a position registration.

On the other hand, if there are some allowances for the total C(tn) of the count of local authentication A(tn) and the count of preliminary authentication B(tn), that is, the total C(tn) falls somewhat below the maximum value of the number of terminals being able to be accommodated, the bandwidth of the communication path through which the second wireless system 30 transfers the preliminary authentication request is limited only in the case where the ratio of the count of preliminary authentication B(tn) is high. Accordingly, it is possible to prevent the resources in the base station 23 from being occupied by terminals 34 corresponding to the count of the preliminary authentication B(tn).

It is to be noted here that by limiting the bandwidth of the communication path through which the second wireless system 30 transfers the preliminary authentication request, the frequency of receiving the preliminary authentication request at each base station 23 is decreased. Under these conditions, it is conceivable that in the second wireless system 30, there may be some wireless terminals 34 which are not able to finalize the preliminary authentication before the handover. In the situation above, however, the authentication process may be executed after the handover, by directly registering the position in the base station 23 through the wireless communication. With this configuration, it is still possible to perform the handover, even though there remains a possibility that an extra time is required for the authentication process.

Figure 5:
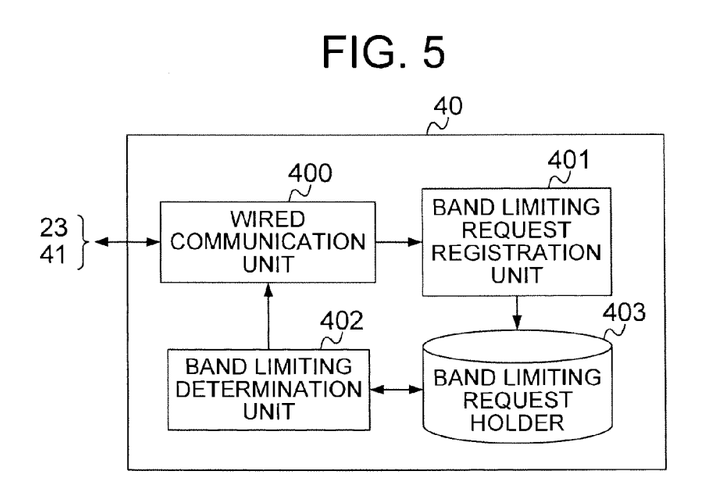
FIG. 5 is a block diagram showing one example of a functional configuration of the bandwidth control device.

FIG. 5 is a block diagram showing one example of the functional configuration of the bandwidth control device 40.

The bandwidth control device 40 has a wired communication unit 400, a band limiting request registration unit 401, a band limiting determination unit 402, and a band limiting request holder 403.

The wired communication unit 400 transmits and receives data to and from the base station 23 and the router 41 by means of the wired communication. Upon receipt of a band limiting request from the base station 23 via the wired communication unit 400, the band limiting request registration unit 401 registers the base station ID included in the band limiting request, in the band limiting request holder 403.

The band limiting determination unit 402 refers to the band limiting request holder 403 at a predetermined timing (e.g., every 10 minutes), and determines whether or not the base station ID is registered in the band limiting request holder 403. In the present embodiment, in the case where at least one base station ID is registered in the band limiting request holder 403, the band limiting determination unit 402 transmits a band limiting instruction to the router 41 via the wired communication unit 400, if the band limiting instruction was not transmitted to the router 41 previous time, and deletes the base station ID in the band limiting request holder 403.

On the other hand, in the case where there is no base station ID being registered in the band limiting request holder 403, the band limiting determination unit 402 transmits a band limitation canceling instruction to the router 41 via the wired communication unit 400, if the band limitation canceling instruction was not transmitted to the router 41 previous time.

Figure 6:
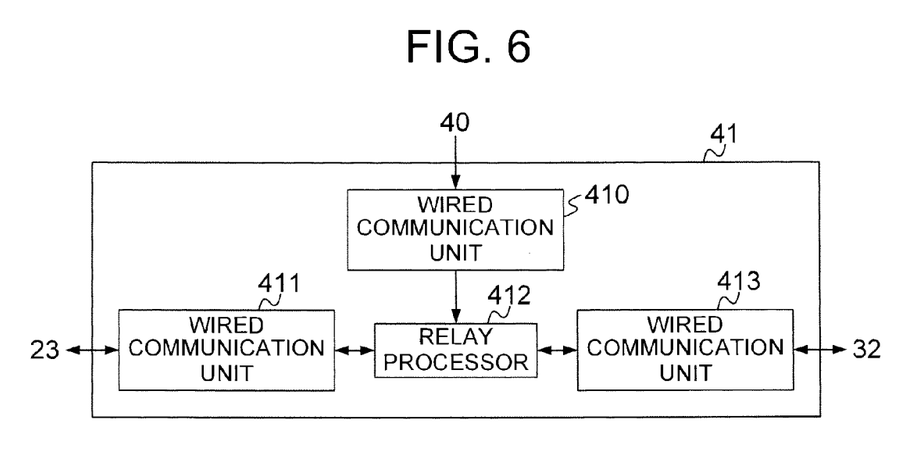
FIG. 6 is a block diagram showing a functional configuration of a router.

FIG. 6 is a block diagram showing one example of the functional configuration of the router 41. The router 41 has a wired communication unit 410, a wired communication unit 411, a relay processor 412, and a wired communication unit 413.

The wired communication unit 410 transmits and receives data to and from the bandwidth control device 40 via the wired communication. The wired communication unit 411 transmits and receives data to and from the base station 23 via the wired communication. The wired communication unit 413 transmits and receives data to and from the moving object management unit 32 via the wired communication.

Upon receipt of the band limiting instruction from the bandwidth control device 40 via the wired communication unit 410, the relay processor 412 limits the bandwidth of the communication path through which the second wireless system 30 transfers the preliminary authentication request. On the other hand, upon receipt of the band limitation canceling instruction from the bandwidth control device 40 via the wired communication unit 410, the relay processor 412 cancels the band limitation of the communication path through which the second wireless system 30 transfers the preliminary authentication request.

The band limitation executed by the relay processor 412 may be designated in advance as an absolute value such as 1 kbps, or it may be designated as a relative value such as 1% of the communication band which has no limitation. In addition, the relay processor 412 temporarily blocks the communication path through which the second wireless system 30 transfers the preliminary authentication request, thereby executing the band limitation. In the present embodiment, when the relay processor 412 limits the communication band, the bandwidth of the communication path through which the second wireless system 30 transfers the preliminary authentication request is limited, uniformly as to all the base stations that receive the preliminary authentication request via the router 41.

Figure 7:
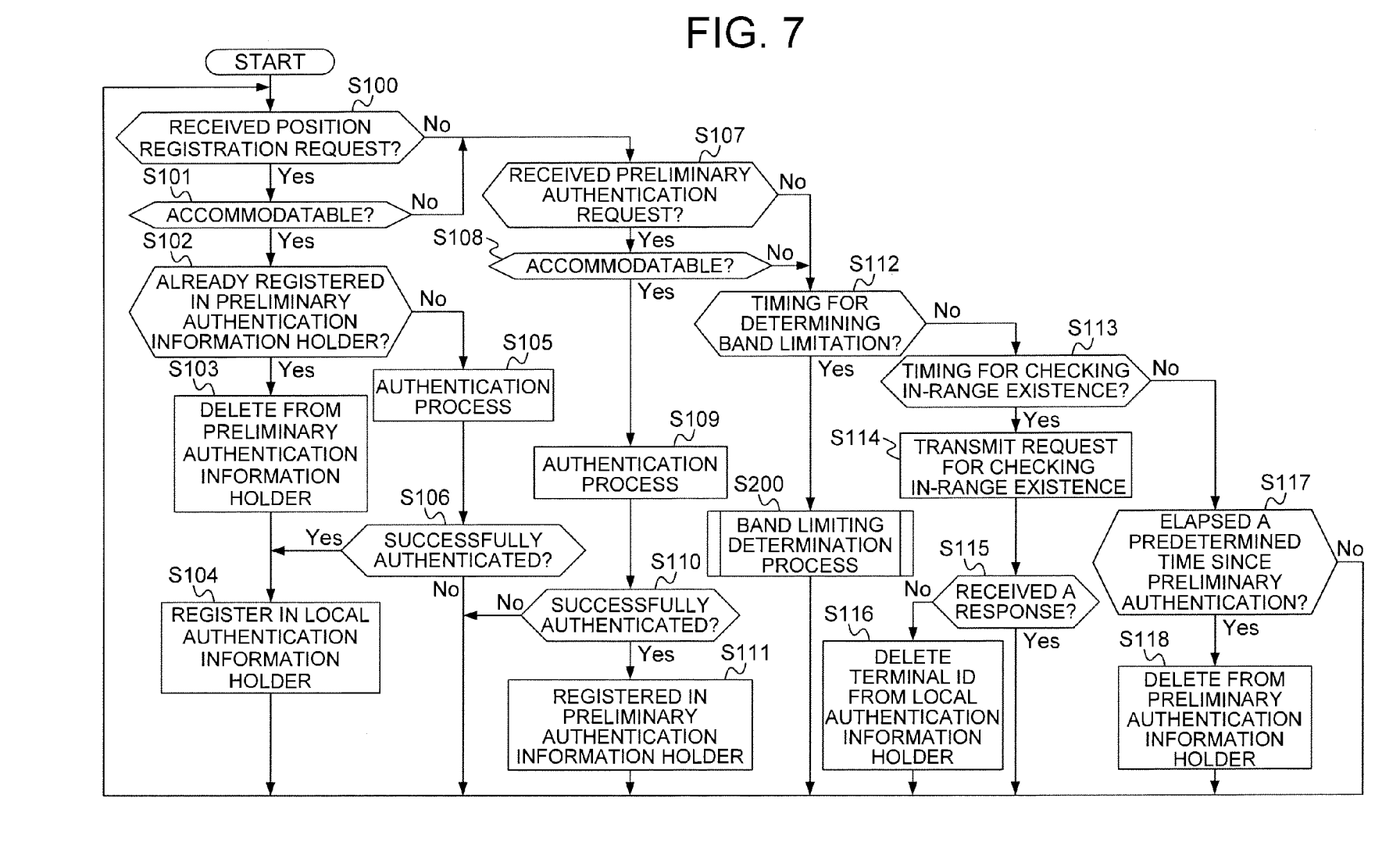
FIG. 7 is a flowchart showing one example of the operation of the base station.

FIG. 7 is a flowchart showing one example of the operation of the base station 23.

Firstly, the wireless communication unit 232 determines whether or not it receives a position registration request from the wireless terminal 24 (S100). Upon receipt of the position registration request (S100: Yes), the wireless communication unit 232 determines whether or not a total of the number of terminal ID held by the local authentication information holder 234 and the number of terminal ID held by the preliminary authentication information holder 235 reaches the maximum number of wireless terminals being able to be accommodated, thereby determining whether or not the wireless terminal 24 is allowed to be accommodated (S101).

If the wireless terminal 24 is not allowed to be accommodated (S101: No), the wireless communication unit 232 returns a notification that the position registration request is rejected, and executes the processing shown in the step S107. On the other hand, if the wireless terminal 24 is able to be accommodated (S101: Yes), the wireless communication unit 232 transfers the position registration request to the authentication information registration unit 233.

Next, the authentication information registration unit 233 determines whether or not the terminal ID of the wireless terminal 24, being the source of transmitting the position registration request, is already registered within the preliminary authentication information holder 235 (S102). If the terminal ID of the wireless terminal 24, being the source of transmitting the position registration request, is already registered within the preliminary authentication information holder 235 (S102: Yes), the authentication information registration unit 233 registers the information of the wireless terminal 24 in a device for managing the positional information of the wireless terminal 24, via the wired communication unit 230.

Then, the authentication information registration unit 233 deletes the terminal ID and the registration date and time of the wireless terminal 24 from the preliminary authentication information holder 235 (S103), and registers the terminal ID of the wireless terminal 24 in the local authentication information holder 234 (S104). Subsequently, the authentication information registration unit 233 notifies the wireless terminal 24 that the position registration is completed via the wireless communication unit 232, and the wireless communication unit 232 executes the process as shown in the step S100, again.

On the other hand, if the terminal ID of the wireless terminal 24 being the source of transmitting the position registration request, is not registered in the preliminary authentication information holder 235 (S102: No), the authentication information registration unit 233 transfers the information of the wireless terminal 24 being the source of transmitting the position registration request to the authentication device 22 via the wired communication unit 230, and allows the authentication device 22 to authenticate the wireless terminal 24 (S105).

If the authentication is successful (S106: Yes), the authentication information registration unit 233 executes the process as shown in the step S104. On the other hand, if the authentication fails (S106: No), the authentication information registration unit 233 notifies the wireless terminal 24 of the failure in the position registration via the wireless communication unit 232, and the wireless communication unit 232 executes the process as shown in the step S100 again.

In the step S100, if any position registration request is not received (S100: No), the authentication information registration unit 233 determines whether a preliminary authentication request is received from the router 41 via the wired communication unit 230 (S107). Upon receipt of the preliminary authentication request (S107: Yes), the authentication information registration unit 233 determines whether or not the total of the number of terminal ID held by the local authentication information holder 234, and the number of terminal ID held by the preliminary authentication information holder 235 reaches the maximum number of wireless terminals being able to be accommodated, thereby determining whether or not the wireless terminal 34 being the source of transmitting the preliminary authentication is able to be accommodated (S108).

If the wireless terminal 34 is not able to be accommodated (S108: No), the authentication information registration unit 233 returns to the wireless terminal 34, a notification that the position registration request is rejected, and the bandwidth control indicator 231 executes the process as shown in the step S112. On the other hand, if the wireless terminal 34 is able to be accommodated (S108: Yes), the authentication information registration unit 233 transfers the information of the wireless terminal 34 being the source of transmitting the preliminary authentication request, to the authentication information registration unit 233 via the wired communication unit 230, and allows the authentication device 22 to authenticate the wireless terminal 34 (S109).

If the authentication fails (S110: No), the authentication information registration unit 233 notifies the wireless terminal 34 of the failure in the preliminary authentication via the wired communication unit 230, and the wireless communication unit 232 executes the process as shown in the step S100, again. On the other hand, if the authentication is successful (S110: Yes), the authentication information registration unit 233 registers the terminal ID and the registration date and time of the wireless terminal 34 in the preliminary authentication information holder 235 (S111). Then, the authentication information registration unit 233 notifies the wireless terminal 34 that the preliminary authentication is completed via the wired communication unit 230, and the wireless communication unit 232 executes the process as shown in the step S100, again.

In the step S107, if any preliminary authentication request is not received (S107: No), the bandwidth control indicator 231 determines whether or not it is the timing for determining the band limitation (S112). If it is the timing for determining the band limitation (S112: Yes), the bandwidth control indicator 231 executes a band limiting determination process described below (S200), and the wireless communication unit 232 executes the process as shown in the step S100, again.

If it is not the timing for determining the band limitation (S112: No), the in-range existence checking unit 236 determines whether or not it is the timing for checking in-range existence (S113). If it is the timing for checking in-range existence (S113: Yes), the in-range existence checking unit 236 transmits an in-range existence checking request to the wireless terminal 24 associated with the terminal ID held by the local authentication information holder 234, via the wireless communication unit 232 (S114).

If a response to the in-range existence checking request is not received (S115: No), the in-range existence checking unit 236 deletes the terminal ID of the wireless terminal 24 not responding to the in-range existence checking request, from the local authentication information holder 234 (S116), and the wireless communication unit 232 executes the process as shown in the step S100, again. On the other hand, if the in-range existence checking unit 236 receives the response to the in-range existence checking request (S115: Yes), the wireless communication unit 232 executes the process as shown in the step S100, again.

In the step S113, if it is not the timing for checking the in-range existence (S113: No), the authentication information registration unit 233 monitors the registration date and time within the preliminary authentication information holder 235 and determines whether or not there exists any terminal ID as to which a predetermined period of time has elapsed since the registration (S117). It there does not exist any terminal ID as to which a predetermined period of time has elapsed since the registration, in the preliminary authentication information holder 235 (S117: No), the wireless communication unit 232 executes the process as shown in the step S100, again.

On the other hand, if there exists a terminal ID as to which a predetermined period of time has elapsed since the registration, in the preliminary authentication information holder 235 (S117: Yes), the authentication information registration unit 233 deletes the terminal ID together with the registration date and time, from the preliminary authentication information holder 235 (S118), and the wireless communication unit 232 executes the process as shown in the step S100, again.

Figure 8:
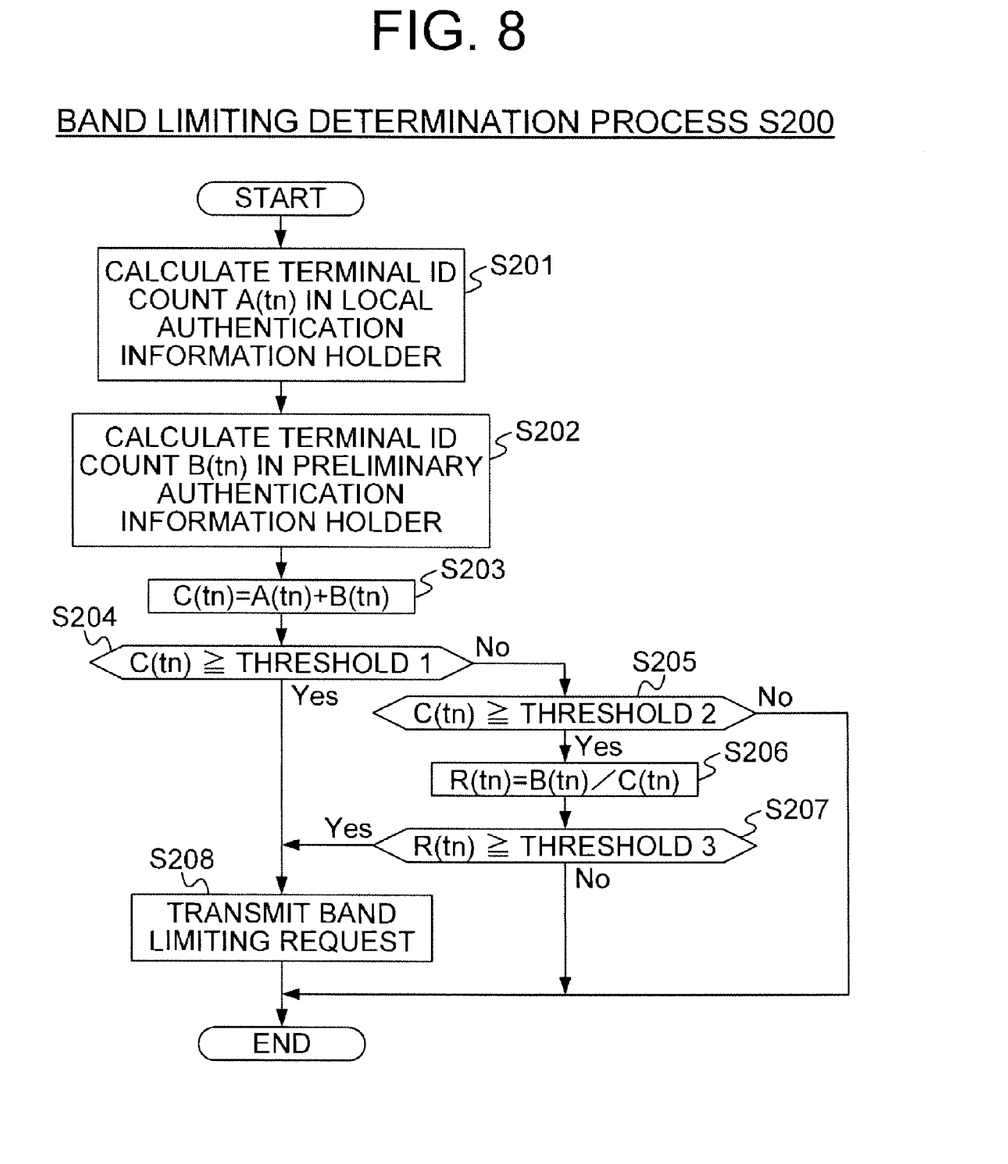
FIG. 8 is a flowchart showing one example of a band limiting determination process.

FIG. 8 is a flowchart showing an example of the band limiting determination process (S200).

Firstly, the bandwidth control indicator 231 calculates the number of terminal ID within the local authentication information holder 234 as the count of local authentication A(tn) (S201), and calculates the number of terminal ID within the preliminary authentication information holder 235 as the count of preliminary authentication B(tn) (S202). Then, the bandwidth control indicator 231 calculates the total C(tn), by adding the count of local authentication A(tn) to the count of preliminary authentication B(tn) (S203).

Next, the bandwidth control indicator 231 determines whether or not the calculated value of C(tn) is equal to or larger than the threshold 1 (e.g., 18) (S204). If the value of C(tn) is equal to or larger than the threshold 1 (S204: Yes), the bandwidth control indicator 231 transmits a band limiting request to the bandwidth control device 40 via the wired communication unit 230 (S208), and finishes the band limiting determination process as shown in the flowchart.

On the other hand, if the value of C(tn) is smaller than the threshold 1 (S204: No), the bandwidth control indicator 231 determines whether or not the value of C(tn) is equal to or larger than the threshold 2 (e.g., 10) (S205). If the value of C(tn) is smaller than the threshold 2 (S205: No), the bandwidth control indicator 231 finishes the band limiting determination process as shown in the flowchart.

On the other hand, if the value of C(tn) is equal to or larger than the threshold 2 (S204: Yes), the bandwidth control indicator 231 calculates a ratio of preliminary authentication R(tn) by dividing the count of preliminary authentication B(tn) by the total C(tn) (S206). Then, the bandwidth control indicator 231 determines whether or not the ratio of preliminary authentication R(tn) is equal to or higher than the threshold 3 (e.g., ¼) (S207).

If the value of R(tn) is equal to or higher than the threshold 3 (S207: Yes), the bandwidth control indicator 231 executes the process as shown in the step S208. On the other hand, if the value of R(tn) is lower than the threshold 3 (S207: No), the bandwidth control indicator 231 finishes the band limiting determination process as shown in the flowchart.

Figure 9:
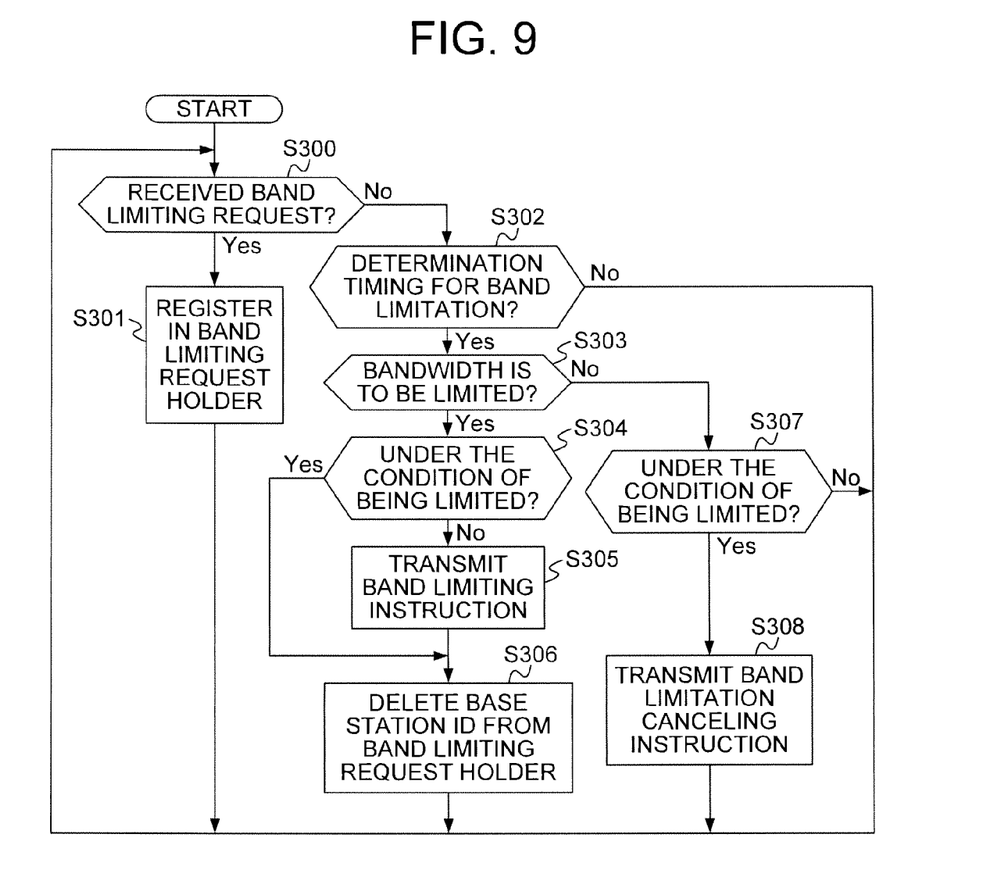
FIG. 9 is a flowchart showing one example of the operation of the bandwidth control device.

FIG. 9 is a flowchart showing one example of the operation in the bandwidth control device 40.

Firstly, the band limiting request registration unit 401 determines whether or not the band limiting request is received from the base station 23 via the wired communication unit 400 (S300). Upon receipt of the band limiting request (S300: Yes), the band limiting request registration unit 401 registers the base station ID included in the band limiting request in the band limiting request holder 403 (S301), and executes the process as shown in the step S300, again.

On the other hand, if the band limiting request is not received (S300: No), the band limiting determination unit 402 determines whether or not it is the timing for determining the band limitation (S302). If it is not the timing for determining the band limitation (S302: No), the band limiting request registration unit 401 executes the process as shown in the step S300, again.

If it is the timing for determining the band limitation (S302: Yes), the band limiting determination unit 402 determines whether or not the bandwidth is to be limited (S303). In the present embodiment, the band limiting determination unit 402 determines the bandwidth is to be limited, in the case where at least one base station ID is registered in the band limiting request holder 403.

If it is determined that the bandwidth is to be limited (S303: Yes), the band limiting determination unit 402 determines whether or not an instruction previously transmitted to the router 41 is a band limiting instruction (S304). If the previously transmitted instruction is the band limiting instruction (S304: Yes), the band limiting determination unit 402 deletes all of the base station ID within the band limiting request holder 403, without transmitting the band limiting instruction to the router 41 (S306), and the band limiting request registration unit 401 executes the process as shown in the step S300, again.

On the other hand, if the previously transmitted instruction is not the band limiting instruction (S304: No), the band limiting determination unit 402 transmits the band limiting instruction to the router 41, stores information that the band limiting instruction has been transmitted (S305), and executes the process as shown in the step S306.

If it is determined that the bandwidth is not to be limited in the step S303 (S303: No), the band limiting determination unit 402 determines whether or not the previous instruction transmitted to the router 41 is the band limiting instruction (S307). If the instruction previously transmitted is not the band limiting instruction (S307: No), the band limiting determination unit 402 does not transmit a band limitation canceling instruction to the router 41 and the band limiting request registration unit 401 executes the process as shown in the step S300, again.

On the other hand, if the instruction previously transmitted is the band limiting instruction (S307: Yes), the band limiting determination unit 402 transmits the band limitation canceling instruction to the router 41, and stores information that the canceling instruction has been transmitted (S308), and the band limiting request registration unit 401 executes the process as shown in the step S300.

One embodiment of the present invention has been explained so far.

As obvious from the explanations set forth above, according to the bandwidth control system 10 of the present embodiment, it is possible to prevent a shortage of resource in the base station 23, the shortage being caused by the preliminary authentication which reserves the resources.

It is to be noted that the present invention is not limited to the embodiment set forth above, but various modifications are included. By way of example, in the aforementioned embodiment, the bandwidth control device 40 and the router 41 are explained as separate structures, but the present invention is not limited to this example. It is alternatively possible that the function of the bandwidth control device 40 may be incorporated in a device like the router 41 or the authentication device 22.

Further in the aforementioned embodiment, the band limiting determination unit 402 of the bandwidth control device 40 transmits a band limiting instruction to the router 41, in the case where at least one base station ID of the base station 23 that has transmitted the band limiting request is registered in the band limiting request holder 403, but the present invention is not limited to this example.

Figure 10:
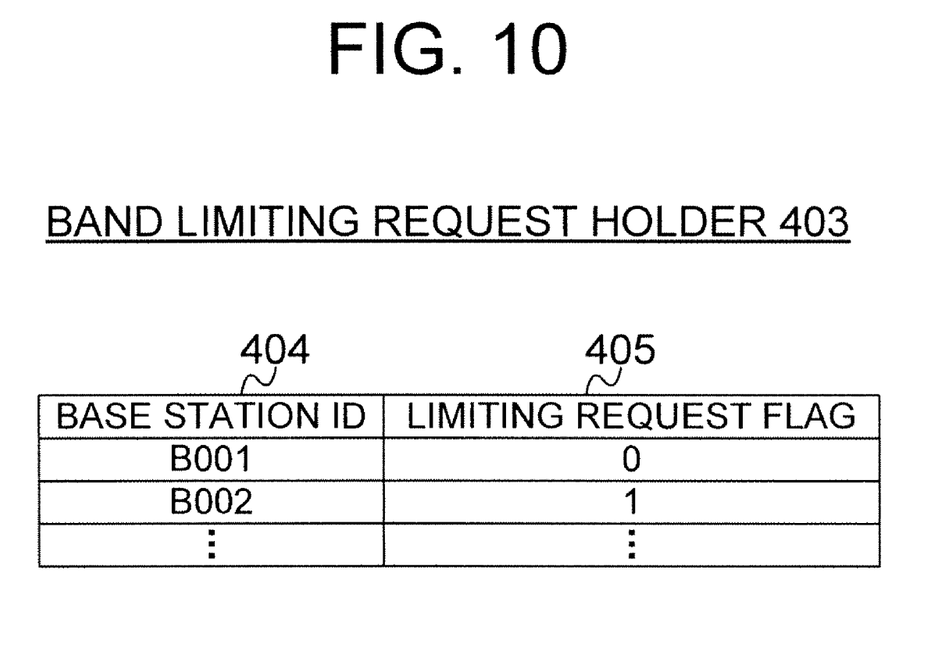
FIG. 10 illustrates an alternative example of data structure held by a band limiting request holder.

By way of example, as shown in FIG. 10, the band limiting request holder 403 holds a limiting request flag 405 which is set to 1 upon receipt of the band limiting request from the base station 23, in association with a base station ID 404 of the base station 23 which receives the preliminary authentication request via the router 41. Upon receipt of the band limiting request, the band limiting request registration unit 401 updates the limiting request flag 405 from 0 to 1 in the band limiting request holder 403, the flag associated with the base station ID 404 of the base station 23 being the source of transmitting the band limiting request.

Then, it is configured as the following; when the timing comes for determining the band limitation, the band limiting determination unit 402 refers to the limiting request flag 405 within the band limiting request holder 403, and determines, in association with the base station ID 404, that the bandwidth is to be limited in the case where the number of base stations 23 requesting the band limitation is larger than the number of the base stations 23 not requesting the band limitation, or in the case where the number of the base stations 23 requesting the band limitation represents a ratio equal to or higher than a predetermined ratio (e.g., 10%) of the total number of the base stations 23 that receive the preliminary authentication request via the router 41.

In the aforementioned embodiment, in response to the band limiting instruction from the bandwidth control device 40, the router 41 limits the bandwidth of the path through which the preliminary authentication request is transmitted to all the base stations 23 which are connected to the router 41, but the present invention is not limited to this example.

For example, in the case where each of the base stations 23 and the router 41 can be separated to use communication paths being different physically or logically, the bandwidth of each path may be limited individually, as to the preliminary authentication request directed to each of the base stations.

In addition, the present embodiment set forth above has been explained in detail, for easily understanding the present invention, and the present invention is not necessarily restricted to the example which is provided with all the explained constitutional elements. A part of the configuration of one embodiment may be replaced by a configuration of other embodiment, and it is further possible to add a configuration of other embodiment to the configuration of one embodiment. Addition of other configuration to a part of the configuration of the present embodiment, deletion thereof, or substitution therefor is also possible.

A part or all of the aforementioned configurations, functions, processing units, and processing means may be implemented by hardware, such as designing an integrated circuit, for instance. Alternatively, software may implement the aforementioned configurations, functions, and the like, by a processor which interprets and executes programs for implementing each of the functions. Information such as programs, tables, files, and the like, for implementing each of the functions may be stored in a recording device such as a memory, hard disk, and an SSD (Solid State Drive), or a recording medium such as an IC card, an SD card, and a DVD.

Control lines and information lines shown and described are limited only to those indispensable for describing the invention and are not necessarily all the control lines and information lines that are required for actual product. In actuality, it can be considered that almost all of the constituent elements are mutually connected to each other.

What is claimed is:

1. A bandwidth control system, comprising,
    a base station provided in a first wireless system,
    a relay device for relaying a preliminary authentication request transmitted from a second wireless system to the base station, and
    a bandwidth control device for controlling a bandwidth of a communication path for relaying the preliminary request from the second wireless system to the base station, wherein,
    the base station comprises,
        a local authentication information holder for storing identification information of a wireless terminal being successful in authentication, among the wireless terminals authenticated by the base station through wireless communication,
        a preliminary authentication information holder for storing identification information of the wireless terminal being successful in preliminary authentication, based on the preliminary authentication request received via the relay device, and
        a band limiting indicator for transmitting to the bandwidth control device, a band limiting instruction to limit a bandwidth of the communication path for relaying the preliminary authentication request from the second wireless system to the base station, in the case where a predetermined relationship is established between a local authentication count corresponding to a count of the identification information of the wireless terminal held by the local authentication information holder, and a preliminary authentication count corresponding to a count of the identification information of the wireless terminal held by the preliminary authentication information holder,
    the bandwidth control device instructs the relay device to limit the bandwidth of the communication path for relaying the preliminary authentication request from the second wireless system to the base station, upon receipt of the band limiting instruction from the base station, and
    the relay device limits the bandwidth of the communication path, upon receipt of the instruction from the bandwidth control device, to limit the bandwidth of the communication path for relaying the preliminary authentication request from the second wireless system to the base station.

2. The bandwidth control system according to claim 1, wherein,
    the band limiting indicator transmits the band limiting instruction to the bandwidth control device, in the case where a total of the local authentication count and the preliminary authentication count is equal to or larger than a first threshold, indicating the number of terminals corresponding to a predetermined ratio to the number of wireless terminals being able to be accommodated in the base station.

3. The bandwidth control system according to claim 2, wherein,
    the band limiting indicator calculates a preliminary authentication ratio by dividing the preliminary authentication count by the total, in the case where the total of the local authentication count and the preliminary authentication count falls in the range smaller than the first threshold and equal to or larger than a second threshold being smaller than the first threshold, and transmits the band limiting instruction to the bandwidth control device, if the preliminary authentication ratio being calculated is equal to or higher than a predetermined third threshold.

4. The bandwidth control system according to claim 1, wherein,
- the base station, more than one, is provided in the first wireless system, and
- the bandwidth control device instructs the relay device to limit the bandwidth of the communication path for relaying the preliminary authentication request from the second wireless system to the base station, upon receipt of the band limiting instruction from at least any one of the base stations.

5. The bandwidth control system according to claim 1, wherein,
- the base station, more than one, is provided in the first wireless system, and
- the bandwidth control device instructs the relay device to limit the bandwidth of the communication path for relaying the preliminary authentication request from the second wireless system to the base station, in the case where the number of the base stations transmitting the band limiting instruction is larger than the number of the base stations not transmitting the band limiting instruction.

6. The bandwidth control system according to claim 1, wherein,
- the bandwidth control device and the relay device are configured as one device.

* * * * *